United States Patent [19]

Williamson

[11] Patent Number: 4,896,960
[45] Date of Patent: Jan. 30, 1990

[54] HIGH SPEED TRANSPORT FOR LARGE FILM FORMATS

[76] Inventor: Geoffry H. Williamson, 10994 Freemont St., Yucaipa, Calif. 92399

[21] Appl. No.: 257,099

[22] Filed: Oct. 13, 1988

[51] Int. Cl.$^4$ .............................................. G03B 1/22
[52] U.S. Cl. ...................................... 352/193; 226/72
[58] Field of Search .................. 352/192, 193; 226/67, 226/68, 70, 71, 72, 73

[56] References Cited

U.S. PATENT DOCUMENTS

| | | | |
|---|---|---|---|
| 1,840,353 | 1/1932 | Fear | 226/72 |
| 1,851,400 | 3/1932 | Mitchell | 226/72 |
| 2,373,243 | 4/1945 | Grimson | 226/72 |

*Primary Examiner*—Monroe H. Hayes
*Attorney, Agent, or Firm*—William H. Maxwell

[57] ABSTRACT

A transport and register movement for high speed motion picture cameras and projectors and having an oscillation axis about which a claw arm oscillates and shiftably carries a claw pin carrier that reciprocates radially from said oscillation axis, including crank and connecting rod drives for separately oscillating and reciprocating motions of the claw arm and claw pin carrier, and coordinated with register pin motion.

22 Claims, 4 Drawing Sheets

HIGH SPEED TRANSPORT FOR LARGE FILM FORMATS

BACKGROUND OF THE INVENTION

This invention relates to motion picture film transport movements for cameras and projectors, and particularly high speed cameras employing large format 35 mm and 70 mm film. Film transport movements are characterized by crank operated claw pins and register pins that advance and position the film respectively, for rapid sequential exposure or projection of the picture frames. The crank motions are made with precision and are balanced to prevent vibration, there being rotating drive parts, reciprocating parts and oscillating parts, the reciprocating and oscillating parts being subject to motion reversals which can be detrimental. That is, mass inertia is to be considered and the accelerations and decelerations minimized.

Heretofore, the film transport claw pins have been integral with the transport arm that reciprocates radially from its oscillating axis, by separate crank and connecting rod means; one means for oscillation and one means for reciprocation. As a result of these combined reciprocating and oscillating motions there is an unwanted increase in the acceleration and deceleration of the claw pins at the points of entry into and exit from the film perforations, it being a general object of this invention to reduce said increases. With this invention the acceleration and deceleration are decreased approximately 25%.

Normal film speed is 24 frames per second at 1440 RPM. However, high speed cameras of the type under consideration operate up to 280 frames per second at 16,800 RPM. A moderate high speed camera operating, for example, at 233 frames per second driven at 14,000 RPM has parts with mass inertia accelerations and decelerations of approximately 4000 gravities, at the aforesaid points of entry and exit of the claw pins into and out of the film.

Therefore and in view of the foregoing, it is an object of this invention to combine the crank and connecting rod means in structural relation with the claw pin arm and claw pins to decrease substantially the accelerations and decelerations of the claw pins and a carrier provided therefor. With the present invention, the claw pin arm is restricted to oscillating motion, and the claw pin carrier reciprocates radially therefrom about the center of arm oscillation.

Accordingly, it is an object of this invention to advantageously employ pure oscillatory motion in the claw arm, for the purpose of reducing acceleration and deceleration forces, when combined with the crank and connecting rod means that drive the same. And, it is another object of this invention to advantageously carry the claw pins by a carrier that reciprocates separately from said oscillating motion when combined with the crank and connecting rod means that drive the same.

Since mass inertia is of prime concern in this high speed film transport, the weight of the oscillating and reciprocating parts is of particular concern. Therefore, it is an object of this invention to reduce the weight of all such parts, namely the connecting rods, wrist pins, pivot block and claw pin arm, claw pin carrier and shaft, and the claw pins. Additionally, the oscillating and reciprocating parts of the register pin motion are of reduced weight, namely the connecting rods, wrist pins, drive bracket and the register pins. In practice, these parts and elements are made of Beryllium or the like, a metallic element of extreme strength and lightness.

The foregoing and various other objects and features of this invention will be apparent and fully understood from the following detailed description of the typical preferred form and application thereof, throughout which description reference is made to the accompanying drawings.

THE DRAWINGS

PREFERRED EMBODIMENT

Figure 1:
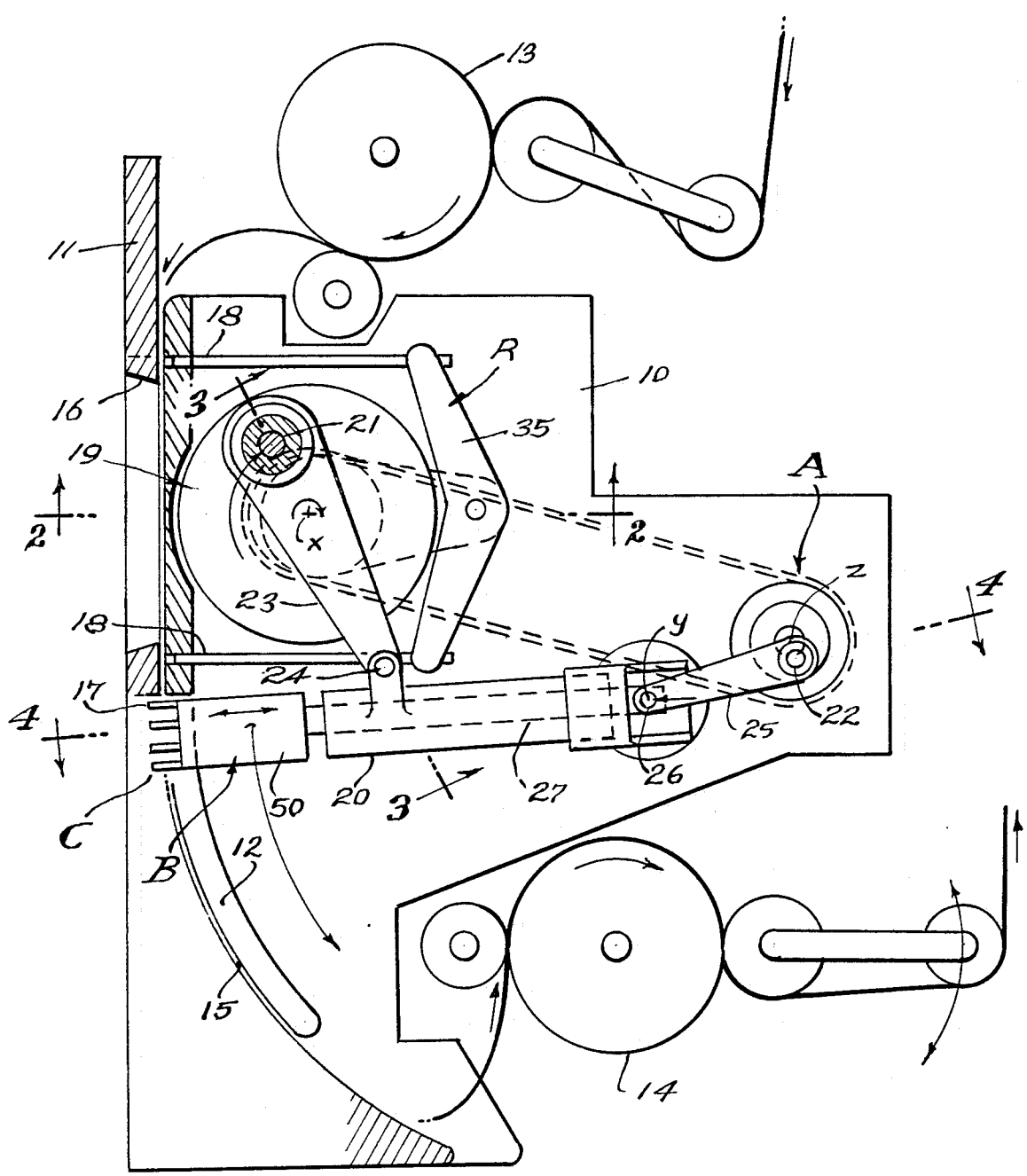
FIG. 1 is a side view, partially in section, showing the transport mechanism of the present invention.

Referring now to the drawings, a film transport of 35 mm film is shown and comprised of claw means C and register means R. The means C and R are carried on axes x and y by a frame 10 with a vertically disposed aperture plate 11 at the front and behind which there is a register plate 12. There is a film path between the plates as shown, said path extending from a top supply sprocket 13 to a bottom take-up sprocket 14. A characteristic feature of this type of film transport is the arcuate lower portion film path 15 beneath the plate opening 16, to accomodate the sweep of the claw pins 17 oscillated by the claw means C. Another characteristic feature is the embracement of the plate opening 16 by the register pins 18 of the register means R. The drive for the means C and R is a crank shaft 19 on the axis x and spaced behind the register plate 12 and above the claw means C and said arcuate portion 15 of the aperture plate 11 and register plate 12.

Accordingly, the axis y carries the claw means C below and substantially rearward of the register means R, there being claw pin control means A on an axis z spaced above and rearward of the axis y. Heretofore, the means at axis z has been employed to reciprocate a claw arm, which adversely shifts the wrist pin connection of the claw means. As disclosed herein the radius of the wrist pin from axis y is not shifted radially, an advantage which results in decreased acceleration and deceleration. However and a feature of this invention, there is a claw pin carrier B that slides radially on a claw arm 20 and that is shifted radially by the control means A.

Figure 5:
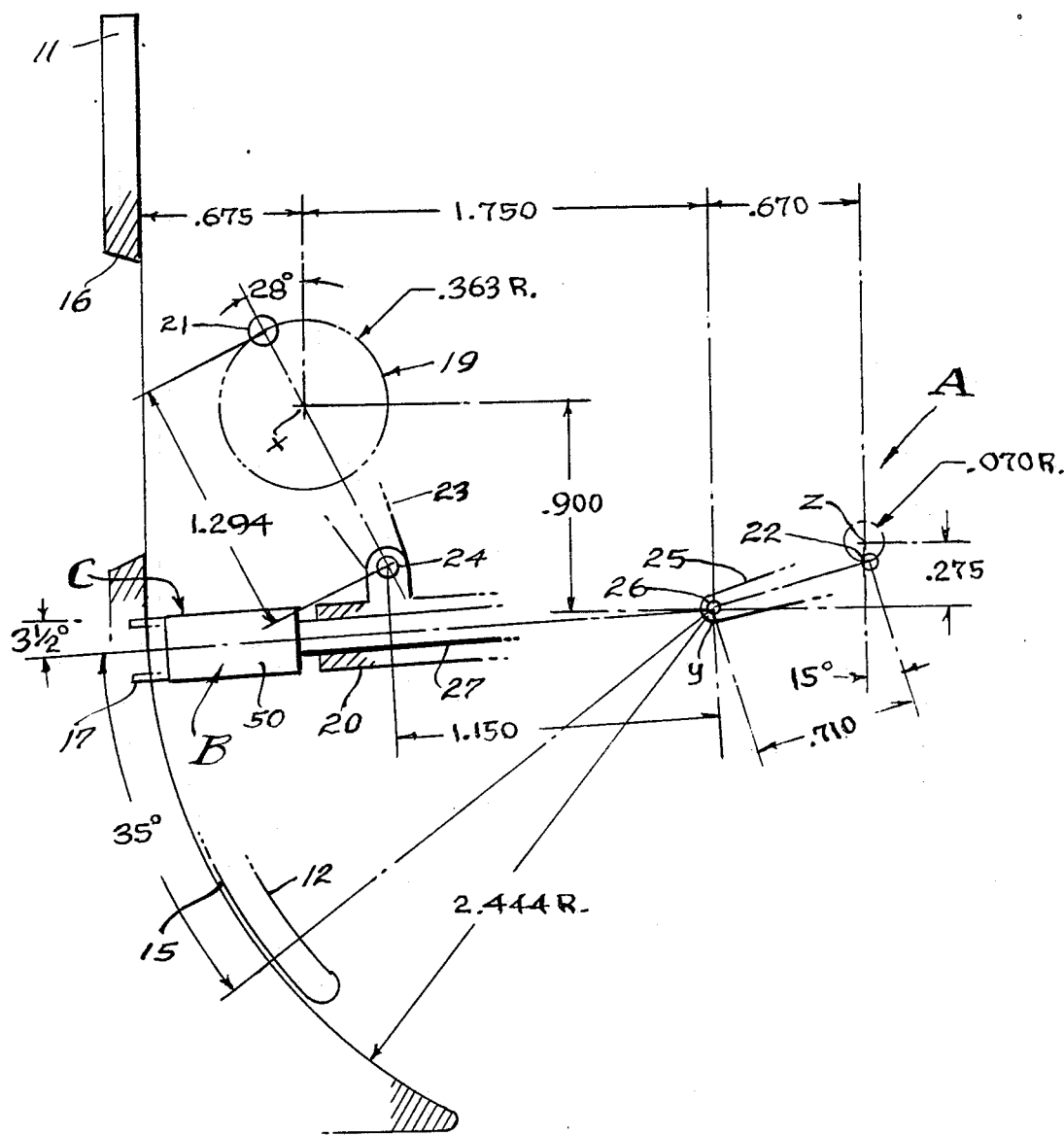

Since relative positions of axes x, y and z and the radii of the crank and connecting rods are important with respect to the arcs of travel, including the claw pin motion through the arcuate path 15 of the film travel, reference is made to FIG. 5 of the drawings illustrating generally the dimensions of a 35 mm movement, as follows: The drive axis x is horizontally disposed 0.675 in. rearward of the film path and centered behind the plate opening 16. The claw pin arm 20 axis y is located 1.750 in. rearward of and 0.900 in. below axis x. And, the control means A axis z is located 0.670 in. rearward of and 0.275 in. above the axis y. As shown in FIGS. 1 and 5, the fully retracted position of the claw arm 20 is 3½° below horizontal, in which position the crank pin 21 at axis x is 28° before top dead center, while the control crank pin 22 at axis z is at 15° before bottom dead center. The claw arm connecting rod 23 from crank pin 21 is 1.294 in. in length to the wrist pin 24 that is 1.150 in. radius from axis y, the throw radius of crank pin 21 being 0.363 in. The claw pin carrier B connecting rod 25 from crank pin 22 is 0.710 in. in length to wrist pin 26 that reciprocates the carrier rod 27 from axis y, the throw radius of crank pin 22 being 0.070 in. And, the radius to the film path 15 from axis y is 2.444 in., the axes x, y and z being geared to crank shaft 19 to turn clockwise at the same rate of angular velocity, preferably by means of a timer belt and toothed cog pulleys. Downward oscillation of claw arm 20 is 35° from the 3½° position shown.

Figure 2:
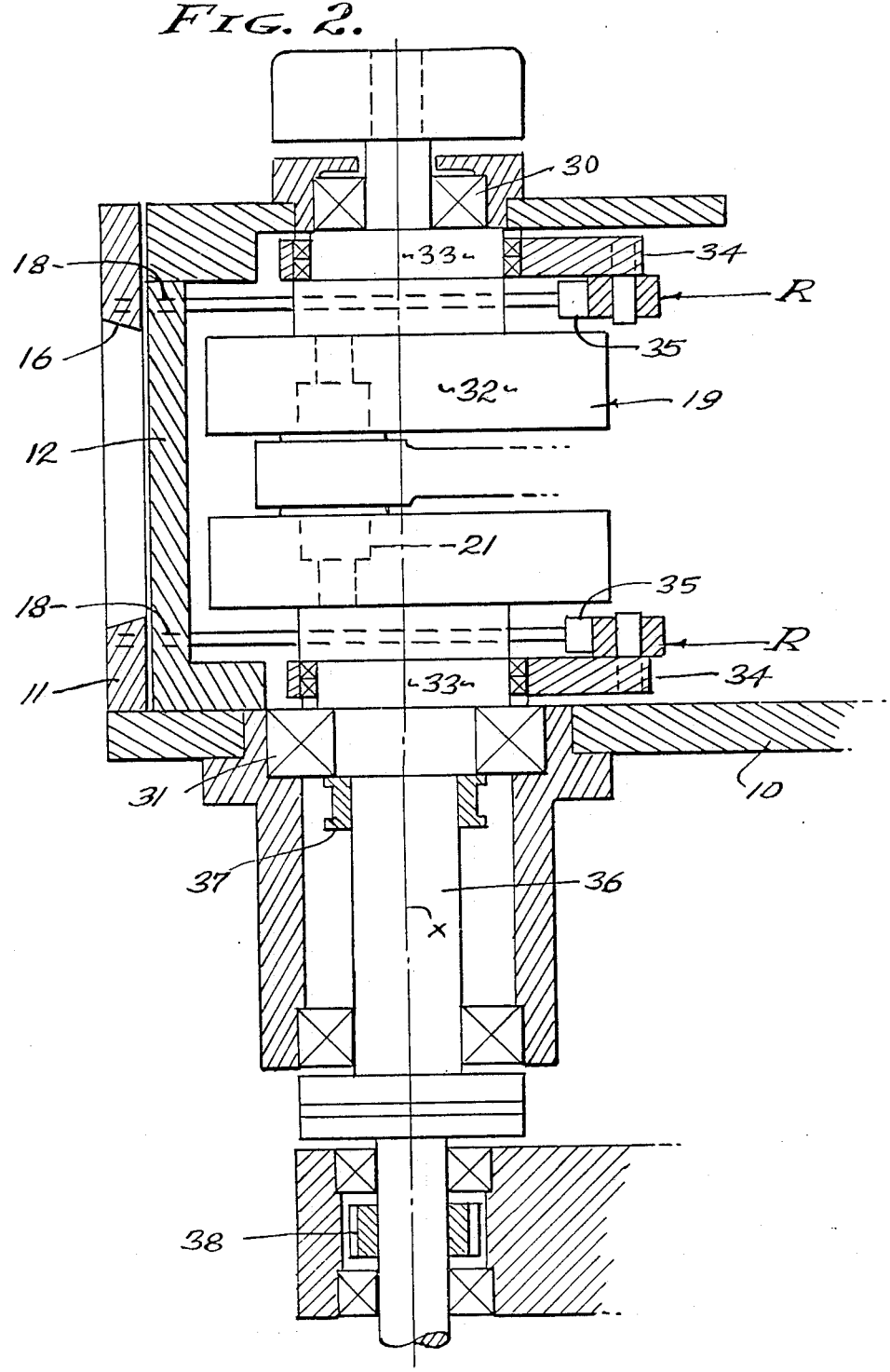
FIG. 2 is an enlarged sectional view taken as indicated by line 2—2 on FIG. 1.
Figure 3:
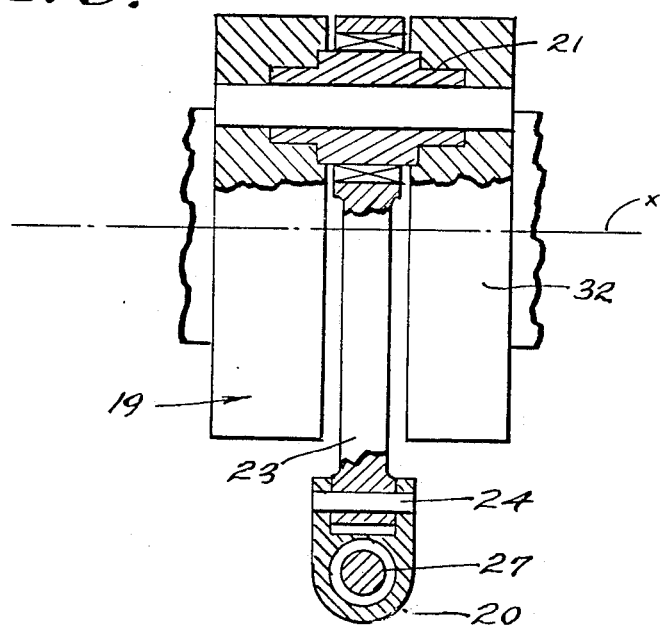
FIG. 3 is an enlarged sectional view taken as indicated by line 3—3 on FIG. 1.

As shown in FIG. 2 of the drawings, the crank shaft 19 is rotatably supported on axis x by spaced anti-friction bearings 30 and 31 between which a counterbalanced crank 32 carries the crank pin 21. Outside of the crank 32 are eccentrics 33 that shift connecting rods 34 to the register pin bracket 35, to shift the register pins 18 carried thereby, in timed relation to turning of the crank shaft. An extension 36 of crank shaft 19 carries a drive pulley 37 for the claw control means A, and carries a drive pulley 38 for the shutter mechanism (not shown).

The crank shaft extension 36 is driven through a coupling as is indicated in the drawings, and by a motor (not shown).

Figure 4:
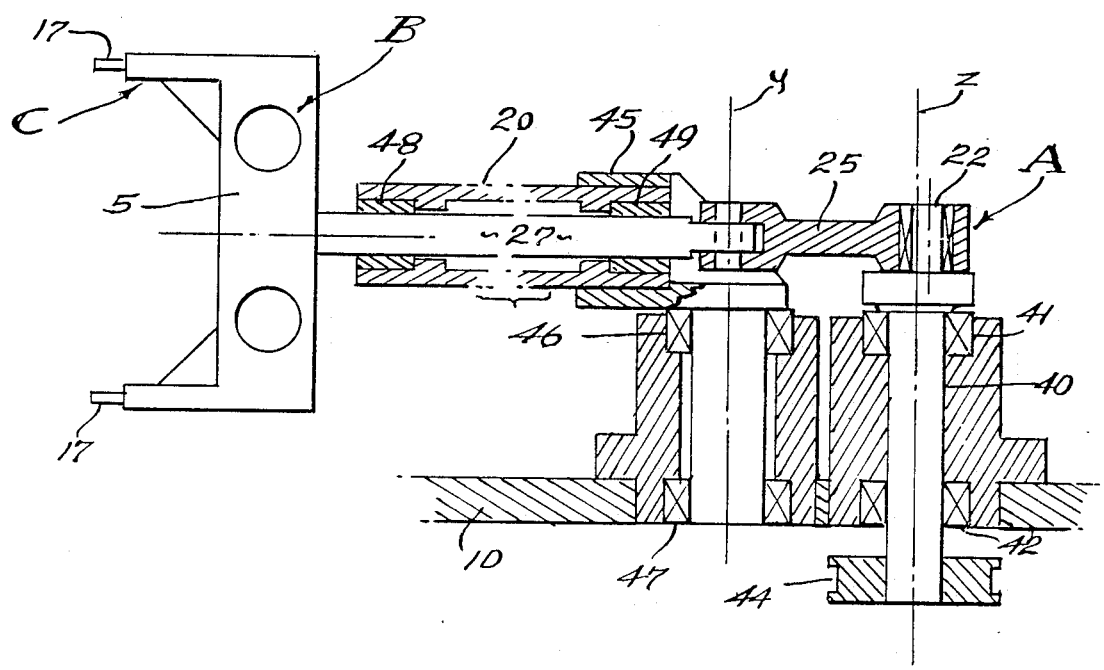
FIG. 4 is an enlarged sectional view taken as indicated by line 4—4 on FIG. 1. and, FIG. 5 is a dimensioned diagram showing the relationship of the oscillation and crank axes.

As shown in FIG. 4 of the drawings, the crank shaft 40 is rotatably supported on axis z by spaced anti-friction bearings 41 and 42, to turn the crank pin 22 that shifts the connecting rod 25 of the claw pin carrier B. An extension of the crank shaft carries a drive pulley 44 driven by a belt from pulley 37, a drive means.

In accordance with this invention, the claw arm 20 is restricted to oscillation on the axis y, and carried by a pivot block 45 supported on spaced anti-friction bearings 46 and 47. In practice and again referring to FIG. 4 of the drawings, the claw arm 20 is tubular with spaced bushings 48 and 49 reciprocably carrying the carrier rod 27 therein. The tubular arm 20 opens rearwardly to expose the carrier rod 27 for wrist pin connection to the connecting rod 25, and forwardly to expose the carrier rod in uniform spaced relation to the register plate 12. That is, the forward open end of the claw arm 20 swings in an arc that is concentric with the arc of the register place 12. A feature of this invention is the fixed radius of wrist pin 24 from the axis y, the claw arm 20 being oscillated by the connecting rod 23 from the crank pin 21.

In accordance with this invention, the claw pin carrier B is provided to reciprocate to and from the forward end of the claw arm 20 of fixed radius movement, and shifted by the control means A including the connecting rod 25 extending from the crank pin 22 to the wrist pin 26. As shown, the axis of wrist pin 26 on connecting rod 25 is coincidental with the axis y when the claw means C is positioned as shown throughout the drawings. Referring again to FIG. 4 of the drawings, the claw pin carrier B is comprised of a header 50 at the forward end of the carrier rod 27, to carry at least one claw pin 18 disengageable through perforations (not shown) of the film to be transported thereby. In practice, the header 50 extends transversely from side to side of the film path to carry at least one claw pin 18 at each side thereof. Still further, and because of the high rate of acceleration and deceleration involved, there is a multiplicity of claw pins 18 at each side of the header (see FIGS. 1 and 4). The arcuate portion of the register plate 12 is slotted to pass the claw pins 18 into and out of path 15 of the film, thereby to engage and disengage the same, by means A reciprocating the rod 27 of the claw pin carrier B.

As shown clearly in the drawings, the claw pin carrier B reciprocates radially from axis y within the arcuate space provided therefor by the limited radius of the claw arm 20. Only the claw pins 18 penetrate through the thickness of the register plate 12, through the slots therein, while the radius from axis y to wrist pin 24 remains constant. The mass inertia involved in extending the claw carrier B and its integral parts is far less than the mass inertia involved in extending the entire prior art claw arm and its associated parts. Furthermore, the geometry involved here in retaining a constant claw arm and wrist pin radius decreases the acceleration and deceleration characteristics, at the start and stop point of film transport, all as hereinabove described and as clearly shown in the drawings.

Having described only the typical preferred forms and applications of my invention, I do not wish to be limited or restricted to the specific details herein set forth, but wish to reserve to myself any modifications or variations that may appear to those skilled in the art, as set forth within the limits of the following claims.

I claim:

1. A film transport for reducing acceleration and deceleration of claw pin engagement, especially in wide format motion picture cameras and projectors, and including;
   a frame having an aperture plate with a plate opening and behind which there is a register plate with a film path therebetween, the aperture and register plates and film path therebetween having an arcuate portion below the plate opening and concentric with an oscillation axis spaced rearwardly therefrom,
   a claw arm carried on said oscillation axis with an end thereof in spaced relation to the arcuate portion of the register plate to swing concentrically therewith and having a wrist pin at a fixed radius from the oscillation axis,
   a drive axis spaced rearwardly from the register plate and above the oscillation axis, and above the wrist pin of the claw arm,
   a first crank shaft on the drive axis and having a crank pin for oscillating the claw arm, there being a connecting rod from said crank pin to the wrist pin of the claw arm,
   a claw pin carrier reciprocably carried at the end of the claw arm in spaced relation to the arcuate portion of the register plate and having at least one claw pin projecting therefrom to disengageably enter film perforations,
   a control axis spaced rearward of the oscillation axis,
   a second crank shaft on the control axis and having a crank pin for reciprocating the claw pin carrier, there being a connecting rod from said crank pin to a wrist pin of the claw pin carrier,
   and a drive means for rotating the two crank shafts at the same rate of angular momentum.

2. The film transport as set forth in claim 1, wherein the oscillation axis, drive axis and control axis are parallel and with anti-friction bearings rotatably supporting the claw pin arm, the first crank shaft and the second crank shaft.

3. The film transport as set forth in claim 1, wherein the control axis is also spaced above the oscillation axis.

4. The film transport as set forth in claim 1, wherein the claw arm is carried by a pivot block rotatable on anti-friction bearings on said oscillation axis.

5. The film transport as set forth in claim 1, wherein the claw arm is tubular for access to the wrist pin of the claw pin carrier from the connecting rod from the second mentioned crank shaft.

6. The film transport as set forth in claim 4, wherein the pivot block, claw pin arm, wrist pin and connecting rod to the first crank shaft are of light weight material.

7. The film transport as set forth in claim 1, wherein the first crank shaft on the drive axis is counterbalanced.

8. The film transport as set forth in claim 1, wherein the first crank shaft on the drive axis includes an eccentric, there being a connecting rod therefrom to a register means.

9. The film transport as set forth in claim 1, wherein the claw pin carrier includes a header having said at least one claw pin and carried on the claw arm by a shiftable rod extending therefrom to the wrist pin of the claw pin carrier.

10. The film transport as set forth in claim 1, wherein the claw pin carrier includes a header having said at least one claw pin and carried on the claw arm by a shiftable rod extending therefrom to the wrist pin and connecting rod from said second crank shaft crank pin.

11. The film transport as set forth in claim 10, wherein the header and said at least one claw pin, rod, wrist pin and connecting rod from the second crank shaft crank pin are of light weight material.

12. The film transport as set forth in claim 1, wherein the claw pin arm is tubular, and wherein the claw pin carrier includes a rod slidable in the tubular claw arm and extending to the wrist pin of the claw pin carrier.

13. The film transport as set forth in claim 1, wherein the claw arm is tubular for access to the wrist pin of the claw arm carrier, and wherein the claw pin carrier includes a header having said at least one claw pin and slidably carried in the tubular claw arm by a rod extending to the wrist pin of the claw pin carrier.

14. The film transport as set forth in claim 1, wherein the claw arm is carried by a pivot block rotatable on anti-friction bearings on said oscillation axis, wherein the claw arm has radially spaced bushings, and wherein the claw pin carrier includes a header having said at least one claw pin and slidably carried in the spaced claw arm bushings by a rod extending to the wrist pin of the claw pin carrier.

15. The film transport as set forth in claim 1, wherein the claw arm is carried by a pivot block rotatable on anti-friction bearings on on said oscillation axis, wherein the claw arm has radially spaced bushings, and wherein the claw pin carrier includes a header having said at least one claw pin and slidably carried in the tubular claw arm by a shiftable rod extending to the wrist pin of the claw pin carrier.

16. The film transport as set forth in claim 14, wherein the wrist pin of the claw pin carrier is accessible to the connecting rod of said second crank shaft crank pin and through the pivot block at said control axis.

17. The film transport as set forth in claim 15, wherein the wrist pin of the claw pin carrier is accessible to the connecting rod of said second crank shaft crank pin and through the pivot block at said control axis.

18. The film transport as set forth in claim 14, wherein the wrist pin of the claw pin carrier is substantially coincidental with the oscillation axis when the claw arm is at the accelerating position.

19. The film transport as set forth in claim 14, wherein the wrist pin of the claw pin arm is substantially coincidental with the oscillation axis when the claw arm is at the deceleration position.

20. The film transport as set forth in claim 14, wherein the wrist pin of the claw pin carrier is substantially coincidental with the oscillation axis when the claw arm is at both the accelerating and decelerating positions.

21. The film transport as set forth in claim 1, wherein the claw pin carrier has a plurality of claw pins.

22. The film transport as set forth in claim 1, wherein the claw pin carrier has a plurality of claw pins at opposite sides of the register plate and arcuate portion of the film path.

* * * * *